United States Patent
Chaouki et al.

(10) Patent No.: US 9,996,856 B2
(45) Date of Patent: Jun. 12, 2018

(54) DIGITAL PRESCREEN TARGETED MARKETING SYSTEM AND METHOD

(71) Applicant: TRANS UNION LLC, Chicago, IL (US)

(72) Inventors: Steven M. Chaouki, Chicago, IL (US); Tammy P. Mitchell, Kenilworth, IL (US); Clifton H. Burns, Geneva, IL (US); Sandra L. Bulmash, Skokie, IL (US)

(73) Assignee: TRANS UNION LLC, Chicago, IL (US)

( * ) Notice: Subject to any disclaimer, the term of this patent is extended or adjusted under 35 U.S.C. 154(b) by 467 days.

(21) Appl. No.: 14/645,127

(22) Filed: Mar. 11, 2015

(65) Prior Publication Data

US 2015/0262248 A1 Sep. 17, 2015

Related U.S. Application Data

(60) Provisional application No. 61/951,524, filed on Mar. 11, 2014.

(51) Int. Cl.
*G06Q 30/00* (2012.01)
*G06Q 30/02* (2012.01)
*G06Q 40/02* (2012.01)

(52) U.S. Cl.
CPC ....... *G06Q 30/0269* (2013.01); *G06Q 40/025* (2013.01)

(58) Field of Classification Search
CPC .......... G06Q 30/0269; G06Q 40/025
See application file for complete search history.

(56) References Cited

U.S. PATENT DOCUMENTS

| 8,412,593 B1* | 4/2013 | Song | G06Q 30/00 705/27.1 |
| 8,762,259 B1* | 6/2014 | Tyo | G06Q 40/025 705/35 |
| 9,152,727 B1 | 10/2015 | Balducci et al. | |

(Continued)

FOREIGN PATENT DOCUMENTS

| JP | 2005-128853 | 5/2005 |
| KR | 10-0637332 | 10/2006 |

(Continued)

OTHER PUBLICATIONS

International Search Report and Written Opinion issued in connection with International Patent Application No. PCT/US2014/063120, dated Jan. 29, 2015. (8 pages).

(Continued)

*Primary Examiner* — Bennett M Sigmond
*Assistant Examiner* — Scott C Anderson
(74) *Attorney, Agent, or Firm* — Neal, Gerber & Eisenberg LLP; William Lenz (57) ABSTRACT

A system and method for electronically providing targeted marketing to a targeted individual is disclosed. An plurality of individuals prescreened to be targeted with targeted marketing is created but such individuals are anonymous to the offerer of the targeting marketing until the offerer is provided with an indication that each targeted individual has been authenticated and is among those that have been prescreened to receive the offer, at which time the offerer may electronically provide and fulfill the offer.

12 Claims, 4 Drawing Sheets

(56) References Cited

U.S. PATENT DOCUMENTS

| | | |
|---|---|---|
| 2003/0233357 A1 | 12/2003 | Merenda et al. |
| 2004/0088255 A1 | 5/2004 | Zielke et al. |
| 2008/0199042 A1 | 8/2008 | Smith |
| 2009/0063284 A1 | 3/2009 | Turpin et al. |
| 2009/0129377 A1 | 5/2009 | Chamberlain et al. |
| 2010/0241508 A1* | 9/2010 | Ikonen ............ G06Q 30/02 705/14.42 |
| 2011/0066705 A1 | 3/2011 | Wilson |
| 2011/0119111 A1 | 5/2011 | Hanna |
| 2013/0055309 A1* | 2/2013 | Dittus ............ H04N 21/2668 725/35 |
| 2013/0262226 A1 | 10/2013 | Lachapelle et al. |
| 2013/0290167 A1 | 10/2013 | Laky et al. |
| 2014/0278972 A1* | 9/2014 | Yonebahashi ...... G06Q 30/0255 705/14.53 |

FOREIGN PATENT DOCUMENTS

| | | |
|---|---|---|
| KR | 10-2009-0000221 | 1/2009 |
| KR | 10-2010-0062524 | 6/2010 |
| KR | 10-2013-0062431 | 6/2013 |
| WO | 01-37183 | 5/2001 |
| WO | 2013148356 | 10/2013 |

OTHER PUBLICATIONS

International Search Report and Written Opinion issued in connection with International Patent Application No. PCT/US2015/019988, dated May 29, 2015. (9 pages).

International Search Report and Written Opinion issued in connection with International Patent Application No. PCT/US2013/032484, dated Jun. 28, 2013. (8 pages).

* cited by examiner

DIGITAL PRESCREEN TARGETED MARKETING SYSTEM AND METHOD

CROSS-REFERENCE TO RELATED APPLICATION

This application claims the benefit of U.S. Provisional Patent Application No. 61/951,524 filed on Mar. 11, 2014, which is incorporated by herein by reference in its entirety.

TECHNICAL FIELD

This application relates generally to the marketing industry, and more particularly to systems and methods of targeted digital or electronic marketing to one or more targeted recipients.

BACKGROUND

In prior Internet marketing systems, users, such as buyers of advertising space, advertising businesses, and other advertisers, directly or indirectly purchase or otherwise obtain the advertising space from distributors, such as advertising networks and publishers, to place or otherwise distribute advertisements to targeted individuals using data gleaned from the online activity of the targeted individuals. Targeted individuals may include, for example, consumers and/or persons employed, affiliated, and/or associated with a business, such as owners, executives, and/or employees of the business. Distributors may own the advertising space and/or represent another entity which owns the advertising space. For example, if a consumer navigates to a travel website and enters parameters for a desired vacation, the parameters can be stored as part of the consumer's browsing data, which may include other online consumer behavior and associated data. The distributor can obtain or otherwise interrogate this browsing data and use it to identify advertisements tailored to the various parameters, and serve the advertisements to the device(s) associated with the browsing data for presentment to the consumer using the device(s).

There are drawbacks, however, to prior targeted marketing platforms. In particular, the users and distributors who leverage browsing data are not capable of identifying targeted individuals and matching various data to the targeted individuals and/or to aggregated pools with sufficient accuracy. For example, browsing data, such as data stored as cookies or other data on a device, is generally anonymous in that no personally identifiable information is included in such data. Personally identifiable information must be provided by the consumer. In addition, while the browsing data is associated with the device on which the browsing is performed, multiple people may use a single device, thus leaving open the possibility many individuals may be doing the browsing. As a result, the users are limited in their ability to identify targeted individuals with targeted marketing materials, including credit-, service-, or product-related advertisements and offers, such as, for example, credit card applications, small business loans, vehicle offers, non-financial services offers, offers related to improving business operations, and/or other similar advertisements and offers that may require authentication of the identity of the recipient. Consequently, electronically delivered marketing campaigns including an offer of credit, for example, cannot be made using prior systems because prior systems cannot ensure that the targeted consumer is matched to the right household, and will receive an offer during a campaign. Traditional prescreen offers involve a financial institution determining their criteria, a credit bureau generating a prescreen list based on the criteria, and executing a campaign whereby all consumers on the prescreen list receive a firm offer of credit via direct mail, email, or other traditional channels where the identity of the recipient can be assured. Digital prescreen offers have not previously been made in the marketplace because a financial institution cannot ensure the offer will be made to the targeted consumer.

Consequently, there exists a need for improved systems and methods that can permit the electronic delivery of certain marketing offers that in the past could not be made electronically due to uncertainty as to the identity of the recipient and the preapproved offers available to that recipient.

SUMMARY

A system and method for electronically delivering targeted marketing to a targeted individual is disclosed. An initial plurality of individuals prescreened to be targeted with targeted marketing is created but such individuals are anonymous to the offerer of the targeting marketing until the offerer is provided with an indication that each targeted individual has been authenticated and is among those that have been prescreened to receive the offer, at which time the offerer may electronically complete the offer.

In one embodiment, a computer system for electronically providing targeted marketing to a targeted individual is disclosed, comprising: (a) a database comprising a plurality of credit data files stored thereon, each of the plurality of credit data files associated with a respective consumer; and (b) a targeted marketing processing engine in communication with the database and a network, the targeted marketing processing engine for: (i) transmitting, via the network, an anonymous cookie data file to an advertising entity such that the advertising entity provides a digital advertisement for display on a user's device upon receiving an initial indication that the user may be among the plurality of individuals to be targeted with the targeted marketing, wherein the digital advertisement is selectable by the user and associated with a prescreened offer for credit, wherein the anonymous cookie data file is associated with a plurality of individuals to be targeted for the targeted marketing; (ii) receiving, via the network, information indicative of an identity of the user; (iii) authenticating the identity of the user, based on the received information indicative of the identity of the user; (iv) if the identity of the user is authenticated, determining whether the identity of the user matches one of the plurality of individuals to be targeted with the targeted marketing; (v) if the identity of the user matches one of the plurality of individuals to be targeted with the targeted marketing, transmitting, via the network, a first indication to a financial institution that the identity of the user matches one of the plurality of individuals to be targeted with the targeted marketing such that the financial institution presents the prescreened offer for credit on the user's device and fulfills the prescreened offer for credit, and (vi) if the identity of the user does not match one of the plurality of individuals to be targeted with the targeted marketing, transmitting, via the network, a second indication to the financial institution that the identity of the user does not match one of the plurality of individuals to be targeted with the targeted marketing.

In another embodiment, a method for electronically providing targeted marketing to a targeted individual using a processor is disclosed, comprising the steps of: (a) transmitting, via a network, an anonymous cookie data file from a processor to an advertising entity such that the advertising entity provides a digital advertisement for display on a user's device upon receiving an initial indication that the user may be among the plurality of individuals to be targeted with the targeted marketing, wherein the digital advertisement is selectable by the user and associated with a prescreened offer for credit, wherein the anonymous cookie data file is associated with a plurality of individuals to be targeted for the targeted marketing; (b) receiving, via the network at the processor, information indicative of an identity of the user; (c) authenticating the identity of the user, using the processor, based on the received information indicative of the identity of the user; (d) if the identity of the user is authenticated, determining whether the identity of the user matches one of the plurality of individuals to be targeted with the targeted marketing, using the processor; (e) if the identity of the user matches one of the plurality of individuals to be targeted with the targeted marketing, transmitting, via the network, a first indication from the processor to a financial institution that the identity of the user matches one of the plurality of individuals to be targeted with the targeted marketing such that the financial institution presents the prescreened offer for credit on the user's device and fulfills the prescreened offer for credit; and (f) if the identity of the user does not match one of the plurality of individuals to be targeted with the targeted marketing, transmitting, via the network, a second indication from the processor to the financial institution that the identity of the user does not match one of the plurality of individuals to be targeted with the targeted marketing.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates and exemplifies one or more embodiments in accordance with their principles. This description is not provided to limit the embodiments described herein, but rather to explain and teach the principles of the embodiments in such a way to enable one of ordinary skill in the art to understand these principles and, with that understanding, be able to apply them to practice not only the embodiments described herein, but also other embodiments that may come to mind in accordance with these principles. The scope of the embodiments is/are intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers such as, for example, in cases where such labeling facilitates the didactic purpose of the specification. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the embodiments as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

As used herein, the term "online data" can refer to data associated with Internet or online activity, such as, for example and without limitation, data associated with web browsing, click-through data, click stream data, cookies, e-mail account information (e.g., e-mail addresses, names, etc.), online registration data (e.g., names, addresses, phone number, etc.), online transaction data, online site usage data (e.g., social networking usage data, etc.), IP addresses, electronic device identifiers (e.g., IMEI, IMSI, UDID, Android ID, phone numbers, etc.), search result data, biometric data, network identifiers, Media Access Control addresses, and/or other similar data, regardless of whether the device from which such data is associated is a personal computer (PC; IBM-compatible, Apple-compatible, or otherwise), a workstation, or a mobile or portable device (personal digital assistant, cellular or satellite phone, tablet, portable computing device, or other handheld or transportable device). Online data may also include data associated with mobile applications executing on electronic devices, SMS messages, instant messages, and the like. Further, as used herein, the term "offline data" can refer to any data that is associated with non-Internet or non-online activity and that is separate from the online data. For example and without limitation, offline data can be consumer- or business-related data, consumer identifying data, aggregated credit data, credit scores, pre-screen offers, business identifiers, product profits, estimated incomes, actual incomes, consumer behavioral data, wealth data, education data, vehicle ownership data, proprietary data, non-aggregated credit data, public records, and/or similar data.

It should also be noted that the disclosures made in this specification are in accordance with the principles of the embodiments disclosed herein, which are intended to be disclosed or interpreted to their broadest extent under the patent laws, and while such disclosure may describe or otherwise cover subject matter that may be regulated by other existing laws or regulations, including, without limitation, the Fair Credit Reporting Act (FCRA) or the Equal Credit Opportunity Act (ECOA), nothing in this disclosure is intended to suggest or imply noncompliance with any such law or regulation by the assignee. It should also be noted that nothing in this disclosure is intended to suggest or imply that aggregated credit data can be used to determine the credit or insurance eligibility of an individual consumer and/or targeted individual.

As will be described more fully herein, according to a particular aspect, the principles of the invention generally facilitate effective and compliant leveraging of digital marketing for prescreened offers. By using financial institution criteria (without using name and address) to select the prescreen criteria and using match keys to identify records between the financial institution and a credit bureau, a prescreen list may be created without name and address or other personally identifiable information. The credit bureau or an agent of the credit bureau may hold the prescreen list, match consumers to the list and cause offers to be electronically delivered on a one to one basis, such as through an advertising entity. The credit bureau may withhold the prescreen list until after the advertisement is delivered, the consumer clicks through and verifies their identity, and the prescreen offer is made. Once this process is complete, the prescreen list may be delivered to the financial institution and a soft inquiry may be posted on a weekly basis—on the back end after the offer has been delivered to the consumer. This and other aspects are described herein in more detail.

Figure 1:
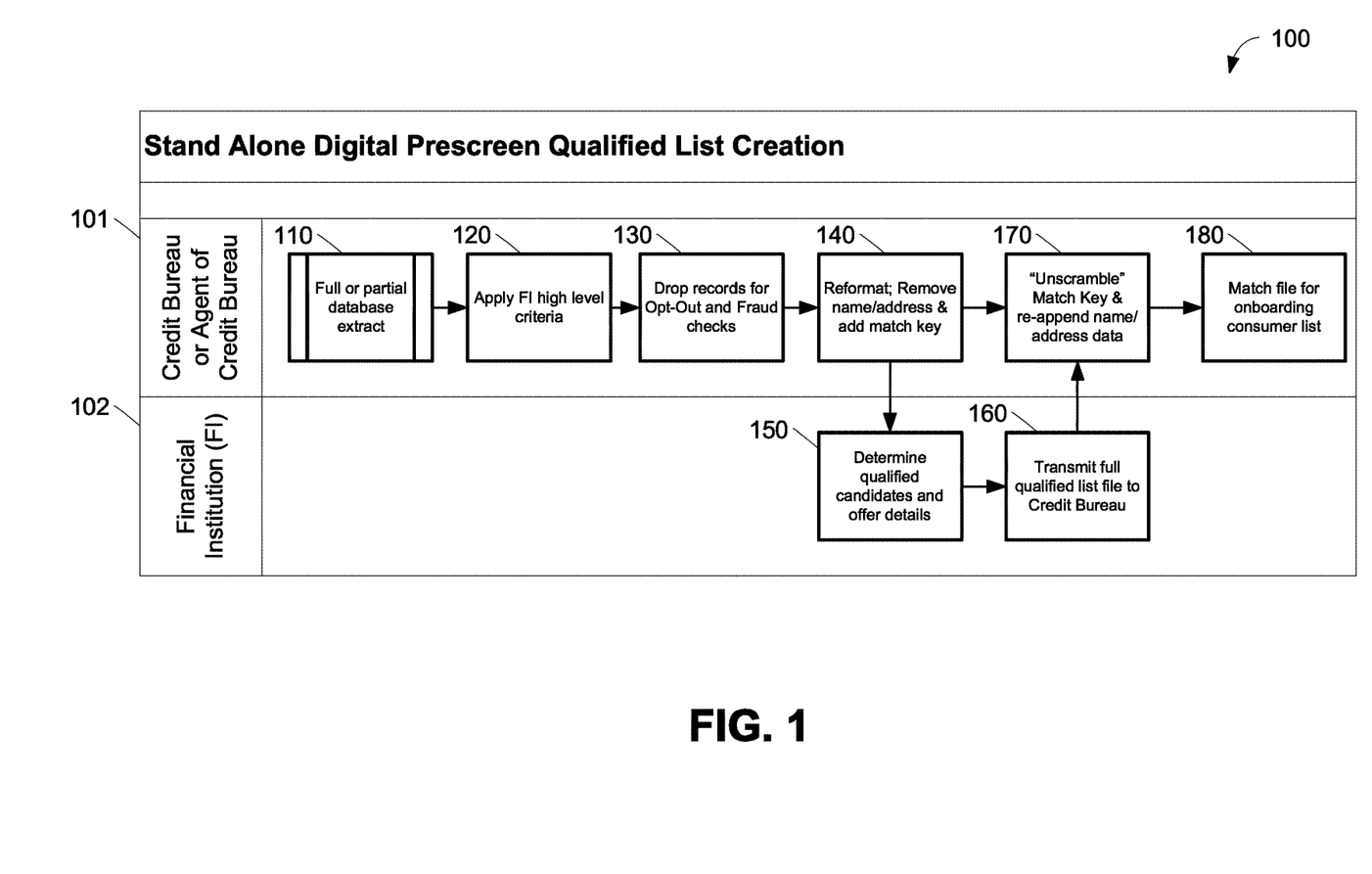
FIG. 1 illustrates one embodiment of a system and method for creating a prescreened list of qualified recipients of electronically deliverable targeted marketing according to one or more aspects described herein.
Figure 2:
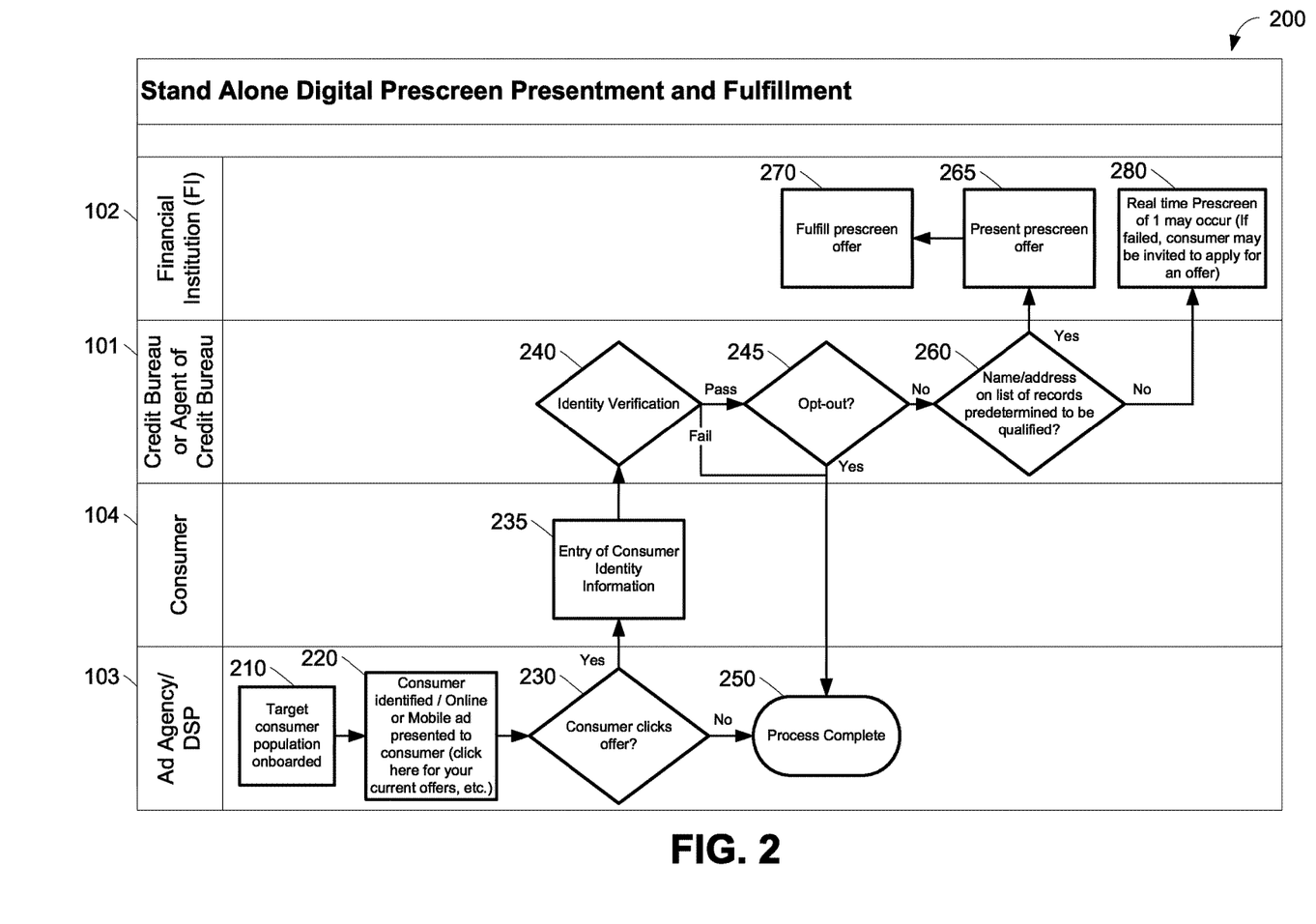
FIG. 2 illustrates one embodiment of a system and method for the electronic presentment and fulfillment of electronically deliverable targeted marketing according to one or more aspects described herein.

Turning now to the drawings, FIGS. 1 to 2 illustrate exemplary embodiments of a digital prescreen system and method for delivering targeted marketing to a targeted individual such as a consumer.

More particularly, FIG. 1 shows one embodiment of a system and method for creating a prescreened list of qualified recipients of electronically deliverable targeted marketing in accordance with the principles of the present disclosure. In this aspect, system 100 is configured to perform steps 110-180 as shown in FIG. 1. At step 110, the system 100 enables the credit bureau 101 to obtain a data file that includes a full or partial extract of a consumer credit database of potential consumers to be targeted for electronic delivery of marketing materials, such as a credit offer, based on a marketing campaign desired by a financial institution 102. At step 120, the system 100 enables the credit bureau 101 to apply certain high-level criteria established by the financial institution 102, such as household geographic location, risk of default, and the like to filter the data file. At step 130, the system 100 enables the credit bureau 101 to filter the data file further to delete any consumers from the population whom the financial institution 102 does not want to receive the marketing offers, such as consumers that do not meet basic lending criteria or consumers who, for example, have requested that they not receive any targeted marketing. At step 140, the system 100 enables the credit bureau 101 to remove all personally identifiable information from the data file while including a non-personally identifiable key configured to later enable the credit bureau 101 to add the personally identifiable information back into each record in the data file. In some embodiments, the key may include a scrambled match key.

The filtered, de-identified or otherwise anonymous data can be provided from the credit bureau 101 to the financial institution 102 so that at step 150, the system 100 enables the financial institution 102 to filter the data file further. The system 100 then provides to the credit bureau 101 at step 160 an initial pre-screened list of de-identified or otherwise anonymous consumers who meet the criteria of the financial institution 102 for receiving targeted marketing material. At step 170, the system 100 enables the credit bureau 101 to re-identify the data file including re-appending the personally identifiable information to the data file using the above-noted key. In some embodiments, the key may be unscrambled to serve the purpose of re-identifying the data file. At step 180, the system 100 enables the credit bureau 101 to match the data file with online data, such as cookies, using, for example, the systems and methods disclosed in U.S. patent application Ser. No. 13/841,022 entitled, "Systems And Methods For Targeted Internet Marketing Based On Offline, Online, And Credit-Related Data," which is incorporated herein by reference in its entirety. In this way, personally identifiable consumer information is not provided to or used by the financial institution 102 to obtain an initial prescreened list of targeted individuals or consumers who qualify to receive targeted marketing in accordance with the parameters of the marketing campaign of the financial institution 102.

Steps 110 through 170 may be performed using any of a plurality of known systems or methods. For example, with respect to step 110, in one embodiment the financial institution 102 may select criteria for initially filtering an extract or prospect database excluding personally identifiable information. With respect to step 180, the credit bureau 101 can be configured to interface with an offline data source and/or an online data source, such as a matching partner or a data mart. In embodiments, the offline data source can interface with the online data source to exchange data, and can be combined into a single processing entity.

The credit bureau 101 can be any company or entity that collects information or data from various sources and provides information about targeted individuals, such as consumers, to other entities for a variety of uses such as, for example, to assess credit worthiness, determine a loan interest rate, and/or other uses. Targeted individuals may be, for example, consumers and/or persons employed, affiliated, and/or associated with a business, such as owners, executives, and/or employees of the business. The information and data can include financial-related information as well as non-financial related and identifying information, such as that found in credit-related data including credit header data, such as, for example, a name, address, telephone number, location information such as ZIP+4 data, and/or other data. Variations in the data include, but are not limited to, nicknames, name reversals, partial names, maiden names and previous addresses. Further, the offline data source can be any company, entity, or component that can aggregate, collect, and store marketing data such as purchasing data, transactional data, and the like. The offline data source can aggregate the data into pools based on demographics (e.g., location, income, etc.) and Internet browsing habits. The online data source can aggregate anonymous browsing behavior from websites such as ecommerce sites, and classify the behaviors.

According to embodiments, a distributor can purchase the online data from the online data source for the purpose of providing advertisements to targeted individuals, such as a plurality of consumers, via a website to which the targeted individuals can browse. The distributor can be any type of data exchange, marketer, ad network, publisher, and/or the like that can use the purchased data to provide advertisements relevant to the targeted individuals via the website. The distributor can be any company, entity or system that can provide, auction, or otherwise sell data, such as online data, intent data, and/or the like, to individuals or entities. In embodiments, the exchange or selling of the data can occur on a real-time basis. More particularly, when the targeted individual navigates throughout or browses to various websites, the distributor can serve targeted advertisements based on the data purchased from the online data source. The targeted advertisements can display on the website to which the targeted individuals are browsing. The website may in some embodiments leverage web tags to cause a web browser to display one or more ads, or otherwise collect data to be provided to the distributor.

At step 180, the credit bureau 101 or matching partner may employ a matching system including a matching engine for receiving, comparing, and matching at least the online data with credit-related data to identify matching targeted individuals. The matching engine may be in communication with the offline data source, the online data source, and/or the user through a data network, such as the Internet. The matching engine may also be in communication with a database, such as a credit data database, which includes the credit-related data, such as credit header data; a key database for storing keys for linking offline data and online data; and/or a supplemental database including supplemental information. In some embodiments, the credit data database and the key database may be included in the matching system and the supplemental database may be external to the matching system. In other embodiments, none, some, or all of these databases may be included in the matching system or may be external to the matching system.

If both an offline data record corresponds to a matching targeted individual and an online data record corresponds to the matching targeted individual, then the matching engine can generate a key to link the offline data record and the online data record. The key may be stored by the matching engine in a key database. The key may be alphabetic, numeric, alphanumeric, and/or in another format. In one embodiment, the key includes one or more identifiers or references to the offline data record and/or the online data records that correspond to the matching targeted individual. In another embodiment, the key includes the offline data record and the online data record corresponding to the matching targeted individual. In a further embodiment, the key includes the offline data record corresponding to the matching targeted individual and a link or reference to the online data record corresponding to the matching targeted individual. In another embodiment, the key includes the online data record corresponding to the matching targeted individual and a link or reference to the offline data record corresponding to the matching targeted individual. The keys may assist the credit bureau 101 in matching online and offline data of a targeted individual.

FIG. 2 shows an embodiment of a system and method for the electronic presentment and fulfillment of targeted marketing in accordance with the principles of the present disclosure. More particularly, system 200 shown in FIG. 2 is configured to electronically present and fulfill electronically deliverable targeting marketing to targeted individuals while the targeted individuals are browsing the Internet upon confirming that the targeted individual is actually doing the browsing. System 200 is configured to continue where system 100 ends, and may, in some embodiments, be the same system.

Once the credit bureau 101 has a key to match the records in the prescreened data file with at least the online data such as cookie data, system 200 is configured to perform steps 210-280 as shown in FIG. 2. At step 210, the system 200 provides cookie population data from the credit bureau 101 to an advertising entity 103, which may include a distributor, a Digital Service Provider, or any company that distributes media or advertisements online who onboards the matched cookie population data. The cookie population data is devoid of personally identifiable information and represents the population of targeted individuals that were previously keyed by the credit bureau 101 to the prescreened list of qualified recipients of targeted marketing in the data file. At step 220, in response to receiving or otherwise interrogating or reading online cookie data from a consumer's computer or device that the identity of the consumer browsing the Internet may match an identity of a targeted individual that has been prescreened in accordance with the description above for system 100, the system 200 is configured to permit the advertising entity 103 to cause a banner type advertisement or other selectable advertisement to appear on the consumer's web browser. At step 230, if the consumer selects the presented advertisement by, for example, clicking the advertisement with a mouse or other input device including pressing a touch screen or by audibly selecting the advertisement using a voice recognition system, the system 200 is configured to allow the consumer 104 to enter his or her identity information at step 235. Such identity information can include personally identifiable information, such as name, address, etc. In some embodiments, the financial institution 102 can host and provide a page for allowing the consumer 104 to enter the identity information. At step 240, the system 200 initiates an identity verification process whereby the credit bureau 101 is called upon to authenticate the identity of the browsing consumer using any one of a number of authentication schemes known in the art, based on the identity information entered at step 235. If the identity verification process fails, then the process ends at step 250. The identity verification process may fail if, for example, the browsing consumer did not completely or accurately respond or enter his or her identity information at step 235. A message (e.g., "No Offer Available", a branding message, an invitation to apply, etc.) may also be generated, transmitted, and presented on the user's device, if the identity verification process fails at step 240. The process may also end at step 250 if the consumer does not select the advertisement at step 220.

If the identity verification process passes at step 240, then at step 245, the consumer can elect to opt-out and not receive the offer that is available to that consumer. If the consumer elects to opt-out at step 245, then the process ends at step 250. A message (e.g., "No Offer Available", a branding message, an invitation to apply, etc.) may also be generated, transmitted, and presented on the user's device, if the consumer elects to opt-out at step 245. However, if the consumer does not elect to opt-out at step 245, then at step 260, the data file is checked by the system 200 at the credit bureau 101 to ensure that the authenticated browsing consumer is listed as being a targeted individual in the prescreen list. If the identity of the browsing consumer matches a targeted individual on the prescreened list of targeted individuals at step 260, then the system 200 enables the financial institution 102 to cause a targeted marketing advertisement or offer (i.e., a firm offer of credit) directed to the prescreened targeted individual to be electronically communicated and presented to the targeted individual on the device being used for browsing by the targeted individual at step 265. The targeted marketing advertisement or offer can be subsequently fulfilled at step 270 by the financial institution 102. However, if the identity of the browsing consumer does not match a targeted individual on the prescreened list of targeted individuals at step 260, then in some embodiments, at step 280, the system 200 enables the financial institution 102 to perform a real-time prescreen of one of the browsing consumer that could result in a firm offer of credit if the browsing consumer is qualified. If the prescreen of one determines that the browsing consumer is not qualified at step 280, then, if desired, the financial institution 102 can invite the browsing consumer to apply to receive marketing materials, including to apply for an offer to receive credit. In other embodiments, if the identity of the browsing consumer does not match a targeted individual on the prescreened list of targeted individuals at step 260, then the process is completed. A message (e.g., "No Offer Available", a branding message, an invitation to apply, etc.) may be generated, transmitted, and presented on the user's device, if the identity of the browsing consumer does not match a targeted individual on the prescreened list of targeted individuals at step 260 and/or if the prescreen of one determines that the browsing consumer is not qualified at step 280.

One of ordinary skill would appreciate that the systems and methods described herein provide a unique solution for positively identifying a particular consumer whose identity is listed among a plurality of consumers prescreened as qualified to receive targeted marketing, such as an offer for credit, using for example a marriage of online data characteristics of the consumer's online browsing behavior, including cookie data, with offline data, including credit related data, and using de-identified and re-identified datasets where various users of such datasets are permitted access only to one or the other dataset configuration in accordance with laws and regulations governing the handling of personally identifiable information. In particular, the de-identified prescreened list of de-identified targeted individuals to receive the marketing campaign is approved on the front end by the financial institution 102, and fulfilled by the financial institution by electronically transmitting targeted marketing such as an offer of credit to a targeted individual occurs after: (1) online data such as cookie data matches the advertising entity's 103 onboarded cookie data, which is derived from the de-identified prescreened data file of qualified recipients of the targeted marketing, and (2) the credit bureau 101 authenticates the identity of the individual to whom an initial targeted marketing item is presented in a browser on the individual's device and who also confirms that the identity is among those on the prescreen list, which in the case of the credit bureau 101, may be the re-identified list.

Figure 3:
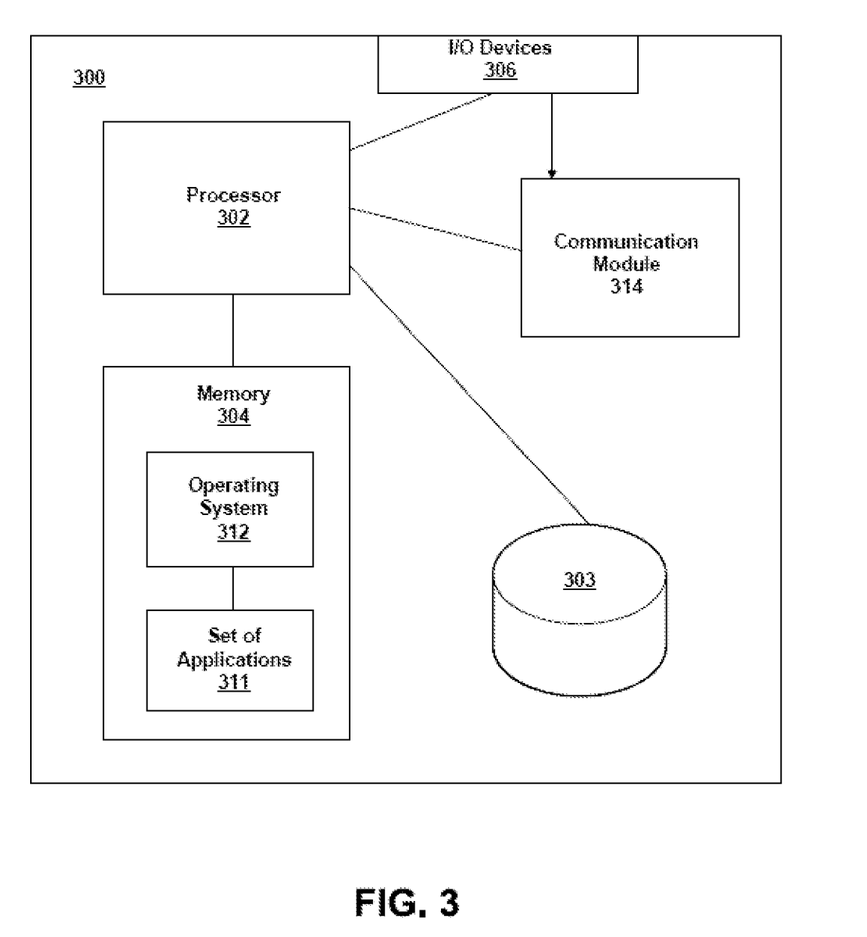
FIG. 3 is a schematic diagram of an exemplary computer system capable of supporting and facilitating one or more aspects described herein.

Various components of systems 100 and 200 may be implemented using software executable by one or more servers or computers, such as a computing device or system 300 with a processor 302 and memory 304 as shown in FIG. 3. These devices may be connected to one or more remote computers and/or web servers via a wired or wireless connection to the Internet. The computing device 300 includes a processor 302, the memory 304, and one or more input and/or output (I/O) devices 306 (or peripherals) that are communicatively coupled via an interface such as one or more buses or other wired or wireless connections, as is known in the art. The processor 302 can be a hardware device for executing software, particularly software stored in the memory 304. Further, the processor 302 can interface with a database 303 that can store various amounts and types of data. For example, the database can store credit-related data and other types of data. Memory 304 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 304 may incorporate electronic, magnetic, optical, and/or other types of storage media. Memory 304 can have a distributed architecture where various components are situated remote from one another, but are still accessed by a processor 302.

The software may include one or more separate programs or applications 311 comprising ordered listings of executable instructions for implementing logical functions. The software stored in memory or on any computer readable medium may include one or more computer programs, each including executable instructions executed by the processor 302. An operating system 312 may control the execution of other computer programs and can provide scheduling, input-output control, file and data management, memory management, and communication control and related services. A computer readable medium includes any electronic, magnetic, optical, or other physical device or apparatus that can contain or store a computer program for use by or in connection with a computer related system or method.

The I/O devices 306 may include input devices, such as a keyboard, mouse, touch screen, and/or any other user interface. The I/O devices 306 may also include output devices, such as a computer display, a modem, a router, serial and parallel wired and wireless communication components and any other elements needed to connect to, for example, another computer or device via a local network or the Internet whether wired or wirelessly. The I/O devices 306 may further include any element or device in a feedback control system for controlling the operation and performance of any aspect of computing device 300.

For purposes of connecting to other computing devices, the computing device 300 is equipped with network communication equipment and circuitry, including a communication module 314. In embodiments, the network communication equipment includes a network card such as an Ethernet card, or a wireless connection card. In a preferred network environment, each of the plurality of computing devices 300 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 600 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Figure 4:
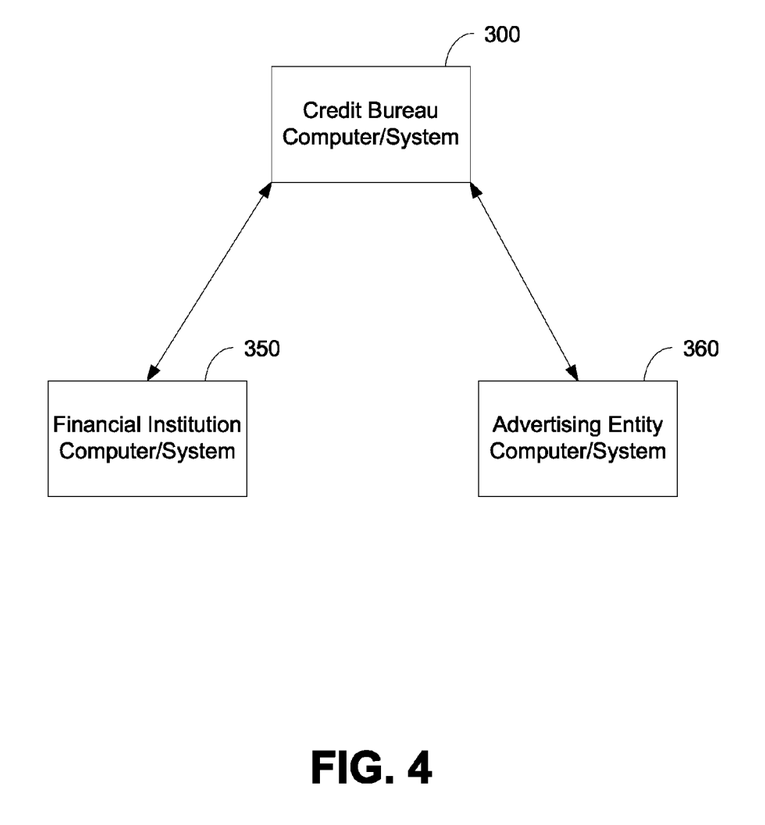
FIG. 4 is a schematic diagram of an exemplary computer system capable of supporting and facilitating one or more aspects described herein.

Turning to FIG. 4, computing device or system 300 associated with credit bureau 101 may be configured to communicate with computing device or system 350 associated with financial institution 102. Likewise, computing device or system 300 may be configured to communicate with computing device or system 360 associated with advertising entity 103. Computing device 350 and computing device 360 may include some or all of the processing, storage, communication capabilities and/or other attributes as described above for computing device 300.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A computer system for electronically providing targeted marketing to a targeted individual, comprising:
 a computer server including a processor and memory, the computer server connected to a network and configured to execute an application stored on the memory;
 a database coupled to the processor, the database comprising a plurality of credit data files stored thereon, each of the plurality of credit data files associated with a respective individual, wherein the application is configured to:
  compile, via the processor and based on the plurality of credit data files, a plurality of individuals qualified to receive an offer for credit;
  compile, via the processor, an anonymous cookie data file comprising browser cookie data associated with the plurality of individuals to be targeted with the targeted marketing;
  transmit, via the network, the anonymous cookie data file to an advertising entity to allow the advertising entity to display the targeted marketing comprising a digital advertisement in a user's web browser based on the browser cookie data and an initial indication that the user is among the plurality of individuals to be targeted with the targeted marketing, wherein the digital advertisement includes a prescreened offer for credit directed to the user subject to confirmation that an identity of the user matches an identity of a targeted one of the plurality of individuals, wherein the digital advertisement is selectable by the user in the web browser and the anonymous cookie data file is associated with a plurality of individuals to be targeted for the targeted marketing;
  receive, from the user via the network, information indicative of the identity of the user and indicative of the user having selected the digital advertisement;
  authenticate the identity of the user, based on the received information indicative of the identity of the user;
  if the identity of the user is authenticated, determine whether the identity of the user matches one of the plurality of individuals to be targeted with the targeted marketing;
  if the identity of the user matches one of the plurality of individuals to be targeted with the targeted marketing, transmit, via the network, a first indication to a financial institution that the identity of the user matches one of the plurality of individuals to be targeted with the targeted marketing to enable the financial institution to display the prescreened offer for credit in the web browser on the users device and fulfills the prescreened offer for credit; and
  if the identity of the user does not match one of the plurality of individuals to be targeted with the targeted marketing, transmit, via the network, a second indication to the financial institution that the identity of the user does not match one of the plurality of individuals to be targeted with the targeted marketing.

2. The computer system of claim 1, wherein the application is configured to:
 if the identity of the user matches one of the plurality of individuals to be targeted with the targeted marketing, enable the user to opt-out of receiving the prescreened offer for credit on the users device; and
 transmit the first indication if the identity of the user matches one of the plurality of individuals to be targeted with the targeted marketing and if the user does not opt-out of receiving the prescreened offer for credit.

3. The computer system of claim 1, wherein the initial indication comprises receiving user cookie data from the users device that matches cookie data in the anonymous cookie data file.

4. The computer system of claim 1, wherein to compile the anonymous cookie data file, the application is configured to:
 extract credit data from the database to create a data file comprising credit data for a plurality of individuals;
 remove personally identifiable information for each of the plurality of individuals in the data file to generate an anonymized data file;
 assign a non-personally identifiable key to the credit data associated with each of the plurality of individuals in the anonymized data file;
 transmit, via the network, the anonymized data file to the financial institution to allow the financial institution to generate a prescreened data file comprising the plurality of individuals to be targeted with the targeted marketing;
 receive from the financial institution, via the network, the prescreened data file;
 using the key, add the personally identifiable information to the plurality of individuals to be targeted with the targeted marketing in the prescreened data file;
 match the plurality of individuals to be targeted with the targeted marketing with online data associated with the plurality of individuals to be targeted with the targeted marketing; and
 generate the anonymous cookie data file based on a match of the plurality of individuals to be targeted with the targeted marketing with the online data associated with the plurality of individuals to be targeted with the targeted marketing.

5. The computer system of claim 4, wherein the application is configured to:
 filter the data file based on criteria established by the financial institution to generate a filtered data file; and
 remove the personally identifiable information by removing the personally identifiable information for each of the plurality of individuals in the filtered data file to generate the anonymized data file.

6. The computer system of claim 4, wherein the application is configured to:
 filter the data file based on consumer opt-out preferences to generate a filtered data file; and
 remove the personally identifiable information for each of the plurality of individuals in the filtered data file to generate the anonymized data file.

7. A method for electronically providing targeted marketing to a targeted individual, comprising:
 transmitting, via a network from a computer server including a processor, an anonymous cookie data file to a computer server associated with an advertising entity to allow the advertising entity to display targeted marketing comprising a digital advertisement in a user's web browser based on an initial indication that the user is among a plurality of individuals to be targeted with the targeted marketing, wherein the digital advertisement includes a prescreened offer for credit directed to the user subject to confirmation that an identity of the user matches an identity of a targeted one of the plurality of individuals, wherein the digital advertisement is selectable by the user in the web browser and the anonymous cookie data file is associated with a plurality of individuals to be targeted for the targeted marketing;

receiving, from the user by the computer server via the network, information indicative of the identity of the user;

authenticating the identity of the user, using the processor, based on the received information indicative of the identity of the user;

if the identity of the user is authenticated, determining using the processor whether the identity of the user matches one of the plurality of individuals to be targeted with the targeted marketing;

if the identity of the user matches one of the plurality of individuals to be targeted with the targeted marketing, transmitting, via the network, a first indication from the processor to a financial institution that the identity of the user matches one of the plurality of individuals to be targeted with the targeted marketing to enable the financial institution to display the prescreened offer for credit in the web browser on the users device and fulfills the prescreened offer for credit; and if the identity of the user does not match one of the plurality of individuals to be targeted with the targeted marketing, transmitting, via the network, a second indication from the processor to the financial institution that the identity of the user does not match one of the plurality of individuals to be targeted with the targeted marketing.

8. The method of claim 7, wherein if the identity of the user matches one of the plurality of individuals to be targeted with the targeted marketing, enabling the user to opt-out of receiving the prescreened offer for credit on the user's device, using the processor; and wherein transmitting the first indication comprises transmitting the first indication if the identity of the user matches one of the plurality of individuals to be targeted with the targeted marketing and if the user does not opt-out of receiving the prescreened offer for credit.

9. The method of claim 7, wherein the initial indication comprises receiving user cookie data from the users device that matches cookie data in the anonymous cookie data file.

10. The method of claim 7, further comprising:

extracting credit data from a database to create a data file comprising credit data for a plurality of individuals, using the processor;

removing personally identifiable information for each of the plurality of individuals in the data file to generate an anonymized data file, using the processor;

assigning a non-personally identifiable key to the credit data associated with each of the plurality of individuals in the anonymized data file, using the processor;

transmitting, via the network, the anonymized data file from the processor to the financial institution to allow the financial institution to generate a prescreened data file comprising the plurality of individuals to be targeted with the targeted marketing;

receiving from the financial institution at the processor, via the network, the prescreened data file;

using the key, adding the personally identifiable information to the plurality of individuals to be targeted with the targeted marketing in the prescreened data file, using the processor;

matching the plurality of individuals to be targeted with the targeted marketing with online data associated with the plurality of individuals to be targeted with the targeted marketing, using the processor; and generating the anonymous cookie data file based on the matching of the plurality of individuals to be targeted with the targeted marketing with the online data associated with the plurality of individuals to be targeted with the targeted marketing, using the processor.

11. The method of claim 10, including filtering the data file based on criteria established by the financial institution to generate a filtered data file, using the processor; and wherein removing the personally identifiable information comprises removing the personally identifiable information for each of the plurality of individuals in the filtered data file to generate the anonymized data file, using the processor.

12. The method of claim 10, including filtering the data file based on consumer opt-out preferences to generate a filtered data file, using the processor; and removing the personally identifiable information comprises removing the personally identifiable information for each of the plurality of individuals in the filtered data file to generate the anonymized data file, using the processor.

* * * * *

UNITED STATES PATENT AND TRADEMARK OFFICE
CERTIFICATE OF CORRECTION

| | | |
|---|---|---|
| PATENT NO. | : 9,996,856 B2 | Page 1 of 1 |
| APPLICATION NO. | : 14/645127 | |
| DATED | : June 12, 2018 | |
| INVENTOR(S) | : Steven M. Chaouki et al. | |

It is certified that error appears in the above-identified patent and that said Letters Patent is hereby corrected as shown below:

In the Claims

Column 11, Line 65, "users" should be "user's"

Column 12, Line 5, "users" should be "user's"

Column 13, Line 20, "users" should be "user's"

Column 13, Line 41, "users" should be "user's"

Signed and Sealed this
Fourth Day of December, 2018

Andrei Iancu
*Director of the United States Patent and Trademark Office*